May 18, 1926.
H. N. ATWOOD
COMPOSITE VEHICLE WHEEL
Filed April 25, 1924
1,585,324
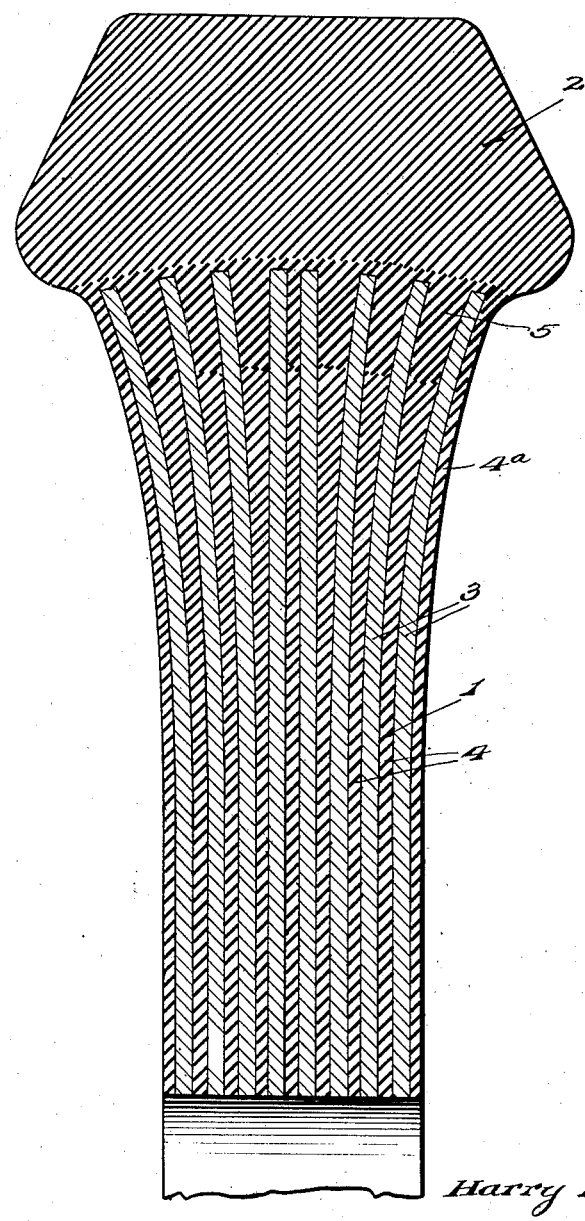
Inventor
*Harry N. Atwood.*
By *Lacey & Lacey,* Attorneys Patented May 18, 1926.

1,585,324

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

COMPOSITE VEHICLE WHEEL.

Application filed April 25, 1924. Serial No. 708,940.

This invention relates to composite vehicle wheels and is designed as an improvement on the structure shown in my Patent 1,458,379, issued June 12, 1923.

In the present invention, as in the invention disclosed in the patent referred to above, it is one of the important objects to provide a composite wheel structure which will possess a desirable degree of resiliency and will absorb to a great extent the shocks and impacts to which it is subjected and which, when subjected to unusual shocks or stresses such, for example, as lateral impacts will yield to a degree sufficient to effect absorption of the shocks and thus obviate splitting of the wheel as would result under similar conditions if the wheel were of the ordinary solid construction and, for example, embodying spokes. Likewise the wheel of the present invention is of a type in which the tire constitutes an integral part with the wheel body, and the present invention more particularly has as its object to provide an improved mode of uniting the tread to the body of the wheel so that there will be no likelihood of the tread being torn loose, and a more firm union will be effected between the parts without detracting from the resilient qualities of the wheel or in any other way impairing its efficiency.

The figure of the accompanying drawing is a diametric sectional view through a portion of a wheel constructed in accordance with the present invention.

While the wheel embodying the invention is in fact an integral structure throughout, it may be considered as comprising a body which is indicated in general by the numeral 1 and a tread which is indicated in general by the numeral 2. As illustrated in the drawing and as in the instance of the patented structure, the body of the wheel is of laminated construction and comprises a plurality of veneer plies 3 and intervening plies 4, of rubber. The veneer plies 3 are of disc-like form and when properly arranged, the grain in adjacent plies will run in non-corresponding directions so as to secure the greatest possible degree of reinforcement and render the wheel uniformly resistant to stresses which would tend to split it. The veneer plies 3 and rubber bonding plies 4 are alternately disposed so that the plies 4 serve not only as a shock-absorbing medium but also as a means for bonding together the plies 3. Two of the plies 4 indicated specifically by the numeral 4ª, are united to the outer faces of the outermost ones of the veneer plies 3 so as to constitute facing surfaces for the wheel body. It will be observed by reference to the drawing that a number of the veneer plies 3 are provided and while in the patented structure the plies were arranged in what may be considered as two sets with the plies of each set dished so that their peripheral portions will curve laterally outwardly, it is preferable, in accordance with the present invention, to form the two middle veneer plies flat throughout their entire area so that they will occupy parallel planes as will be evident by reference to the figure of the drawing. The other veneer plies, however, are dished as stated, either before incorporation in the wheel or at the time of manufacture of the wheel. It is customary to form the felly of a vehicle wheel of a width or thickness greater than the thickness of the body of the wheel at the hub, and in accordance with this practice, the rubber bonding plies 4, with the possible exception of the plies 4ª, are formed of gradually increasing thickness from their centers toward their peripheral portions with the result that when interposed between the veneer plies 3, the latter plies, if not already to formed, will be constrained to assume a more or less dished or concave form except for the middle ones of said plies.

In building up the wheel body it will be the practice to employ soft rubber in forming the plies 4, and by soft rubber is meant a rubber which will contain a relatively small percentage of sulphur and which, upon vulcanization, will retain to a considerable degree, its softness. These plies will, in practice, terminate at their peripheries short of the peripheries of the veneer plies between which they are interposed, so that beyond the peripheries of the soft rubber plies spaces will be left between the peripheral portions of the veneer plies, at this step in the manufacture of the wheel. Into these spaces there is filled a mass or masses of rubber containing a higher percentage of sulphur, this filling being indicated by the numeral 5. The purpose of employing rubber having a higher percentage of sulphur, in this portion of the structure will presently be made apparent.

The tread 2 of the wheel is built up from an integral mass of soft rubber and in the course of manufacture of the wheel is applied about the periphery of the body and roughly shaped to the required form. After application of the rubber mass which is to form the tread, the entire assemblage is introduced into a suitable mold and subjected to heat and pressure, as a consequence of which treatment the rubber will be vulcanized and the plies 4 of rubber will become intimately united to the veneer plies 33 and will bond the latter plies together and will constitute also a resilient or cushioning component element of the wheel body. In this process of vulcanization, the mass of rubber 5 will vulcanize somewhat harder than the mass of rubber comprising the plies 4 and the tread 2. That is to say, the mass of rubber 5 will finally have a consistency somewhat approaching the toughness of leather. Notwithstanding the difference in percentage of sulphur content in the rubber which forms the plies and tread and the mass of rubber 5, all of the rubber masses will be united in the process of vulcanization and the wheel will comprise an integral and composite whole. The mass of rubber 5 extends, preferably, slightly beyond the peripheries of the veneer plies 3 and it will be evident that the tread 2 will become intimately incorporated with and united to the said mass 5 and that the mass 5 will be similarly permanently united to the peripheral portions of the plies 4. The mass or filling 5, being of a high degree of toughness, will constitute a most effective joint between the tread 2 and the peripheral portion of the body of the wheel and there will be no likelihood of the tread being torn loose or becoming separated from the wheel body. Therefore, the harder rubber filling 5 extends over the edges of the veneer plies 3 and prevents these edges cutting into or through the tread 2 which is of softer rubber. Furthermore, the mass 5 of harder rubber will add strength to the said supporting portion of the structure, without, however, materially impairing the resiliency thereof.

From the foregoing description of the invention it will be seen that there is provided a composite wheel which will be exceptionally durable and substantial and which will at the same time possess a desirable degree of resiliency. It will also be evident that not only is the tread of the wheel formed as an integral part with the body of the wheel, but the union is of such character as to positively insure against separation of the tread from the body either by a mutual disunion of the component parts or by being torn loose under conditions of travel.

It will be understood, of course, that the wheel may be made in various sizes and may comprise a greater or less number of veneer and rubber plies. Likewise it will be understood that the tread of the wheel may be fashioned in any desired manner and may be of any desired cross sectional shape.

Having thus described the invention, what is claimed as new is:

1. A vehicle wheel comprising a body and a tread, the body including in its body structure plies of relatively soft rubber material, and plies of fibrous material the tread being of relatively soft rubber material, and a medium of harder rubber material integrally united directly to and incorporated with and uniting to each other the rubber materials of the body and tread.

2. A vehicle wheel comprising a body and a tread, the body including a component of relatively soft rubber material, the tread being of relatively soft rubber material, and a medium of harder rubber material integrally united directly to and incorporated with and uniting to each other the said component of the body and the tread.

3. A vehicle wheel comprising a body and a tread, the body being made up of plies of veneer and plies of relatively soft rubber material, the tread being also of relatively soft rubber material, and a medium of harder rubber material embedding the peripheral portions of the veneer plies and integrally united to and uniting to each other the rubber plies of the body and the tread.

4. A vehicle wheel comprising a body and a tread, the body being made up of plies of veneer and intervening plies of relatively soft rubber material extending outwardly to a point adjacent the peripheries of the veneer plies, the tread being also of relatively soft rubber material and surrounding the body, and a medium of harder rubber material filling the spaces between the peripheral portions of the veneer plies and embedding said portions and integrally united to and uniting to each other the tread and the rubber material of the body.

5. A vehicle wheel comprising a body and a tread, the body being made up of plies of veneer and intervening plies of relatively soft rubber material extending outwardly to a point adjacent the peripheries of the veneer plies, the tread being also of relatively soft rubber material and surrounding the body, and a medium of harder rubber material filling the spaces between the peripheral portions of the veneer plies and integrally united to and uniting to each other the tread and the rubber material of the body, the said medium of harder rubber material extending over the peripheries of the veneer plies and between the same and the softer rubber material of the tread.

6. A vehicle wheel comprising a body made up of a number of plies of veneer, the intermediate plies being substantially flat and parallel to one another throughout their areas and the plies outwardly therebeyond having their peripheral portions outwardly curved in the direction of the adjacent faces of the body, intervening bonding plies of rubber associated with the veneer plies, and a tread of rubber peripherally surrounding the body and integrally united with the said intervening bonding plies.

In testimony whereof I affix my signature.

HARRY N. ATWOOD. [L. S.]